United States Patent

Lin

(10) Patent No.: US 9,520,787 B2
(45) Date of Patent: Dec. 13, 2016

(54) VOLTAGE REGULATOR DEVICE HAVING NEGATIVE CURRENT SENSING AND CONTROL METHOD THEREOF

(71) Applicant: ASUSTeK COMPUTER INC., Taipei (TW)

(72) Inventor: Yi-Peng Lin, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 90 days.

(21) Appl. No.: 14/313,503

(22) Filed: Jun. 24, 2014

(65) Prior Publication Data

US 2015/0002114 A1   Jan. 1, 2015

(30) Foreign Application Priority Data

Jun. 26, 2013   (CN) .......................... 2013 1 0258305

(51) Int. Cl.
    *H02M 3/158*    (2006.01)
    *H02M 3/156*    (2006.01)
    *H02M 1/00*    (2006.01)

(52) U.S. Cl.
CPC ........... *H02M 3/1584* (2013.01); *H02M 3/156* (2013.01); *H02M 2001/008* (2013.01); *H02M 2001/0009* (2013.01)

(58) Field of Classification Search
CPC .. H02M 1/08; H02M 1/156; H02M 2001/008; H02M 3/1588
USPC ....................................... 323/271, 272, 282
See application file for complete search history.

(56) References Cited

U.S. PATENT DOCUMENTS

| 7,242,563 | B2 | 7/2007 | Hua et al. | |
|---|---|---|---|---|
| 7,589,511 | B2* | 9/2009 | Dong | H02M 3/1584 323/225 |
| 8,237,423 | B2* | 8/2012 | Heineman | G06F 1/26 307/151 |
| 2008/0203985 | A1 | 8/2008 | Dong et al. | |
| 2010/0052629 | A1 | 3/2010 | Chu et al. | |
| 2014/0077776 | A1* | 3/2014 | Nguyen | H02M 3/1582 323/271 |
| 2014/0191736 | A1* | 7/2014 | Babazadeh | H02M 3/1582 323/271 |

* cited by examiner

*Primary Examiner* — Yemane Mehari
(74) *Attorney, Agent, or Firm* — Muncy, Geissler, Olds & Lowe, P.C.

(57) ABSTRACT

A voltage regulator device includes at least one output unit, a current sensing unit, a control unit, at least one transistor driving unit and a pulse width modulation unit. The output unit outputs an output signal. The output unit includes a first transistor, a second transistor and an energy storage element. The second transistor is electronically connected to the first transistor and the energy storage element, respectively. The current sensing unit is electronically connected to a first end and a second end of the energy storage element. The control unit is electronically connected to the current sensing unit and the output unit, respectively. The transistor driving unit is disposed corresponding to the output unit and is electronically connected to the control unit and the output unit. The pulse width modulation unit is electronically connected to the control unit and the transistor driving unit, respectively.

12 Claims, 4 Drawing Sheets

VOLTAGE REGULATOR DEVICE HAVING NEGATIVE CURRENT SENSING AND CONTROL METHOD THEREOF

CROSS-REFERENCE TO RELATED APPLICATION

This application claims the priority benefit of China application serial No. 201310258305.8, filed on Jun. 26, 2013. The entirety of the above-mentioned patent application is hereby incorporated by reference herein and made a part of specification.

BACKGROUND OF THE INVENTION

1. Field of the Invention

The disclosure relates to a voltage regulator device and a control method thereof.

2. Description of the Related Art

In general, the power supply does not directly supply power to the center processing unit (CPU) in a computer system. The main reason is that the core voltage (Vcore) required by the CPU changes with the change of the load, thus the core voltage (Vcore) required by the CPU may vary. However, a general power supply cannot react directly to a sudden voltage change. Therefore, a voltage regulator module (VRM) is conducted on the motherboard for supplying power to the CPU. The voltage regulator module can receive feedback signals from the CPU to adjust the voltage according to the feedback signal, and the voltage would not change suddenly because of a sudden change of current to impact the operation of the CPU.

In generally condition, when the output current of the voltage regulator module is above 20 A (the CPU overloads), the voltage regulator module operates at the continuous current mode (CCM), therefore, the output current waveform is continuous triangular waves. When the load current supplied to the CPU instantaneously reduces to less than half of the output current, in which the load is changed from heavy load to light load, the voltage regulator module generates a negative current (the direction of the negative current is opposite to the original current), the negative current causes additional loss and reduces the overall efficiency. In addition, there is a time delay for the negative current rising from the negative lowest point to 0 amps, the time delay makes the voltage regulator module spend more response time to provide positive current to the CPU and thus slows the reaction speed of the voltage regulator module down.

BRIEF SUMMARY OF THE INVENTION

A voltage regulator device includes at least one output unit, a current sensing unit, a control unit, at least one transistor driving unit and a pulse width modulation unit. The output unit outputs an output signal. The output unit includes a first transistor, a second transistor and an energy storage element. The second transistor is electronically connected to the first transistor and the energy storage element, respectively. The current sensing unit is electronically connected to a first end and a second end of the energy storage element. The control unit is electronically connected to the current sensing unit and the output unit, respectively. The transistor driving unit is disposed corresponding to the output unit and is electronically connected to the control unit and the output unit. The pulse width modulation unit is electronically connected to the control unit and the transistor driving unit, respectively.

A control method of a voltage regulator device is disclosed. The voltage regulator device includes at least one output unit, a current sensing unit, a control unit, at least one transistor driving unit and a pulse width modulation unit. The output unit outputs an output signal. The output unit includes a first transistor, a second transistor and an energy storage element. The second transistor is electronically connected to the first transistor and the energy storage element, respectively. The current sensing unit is electronically connected to a first end and a second end of the energy storage element. The control unit is electronically connected to the current sensing unit, the output unit, the pulse width modulation unit and the transistor driving unit, respectively. The control method includes: the current sensing unit senses a current flowing through the energy storage element of the output unit; and when the current sensing unit senses that the current flowing through the energy storage element of the output unit is negative, the control unit correspondingly controls to turn off the first transistor and the second transistor of the output unit to turn off a negative current of the energy storage element.

The voltage regulator device and the control method would not generate additional losses which reduce the overall efficiency, and the time delay which reduces the reaction time of the voltage regulating device is not generated neither.

DETAILED DESCRIPTION OF THE EMBODIMENTS

These and other features, aspects, and advantages of the disclosure will become better understood with regard to the following description, appended claims, and accompanying drawings.

Figure 1:
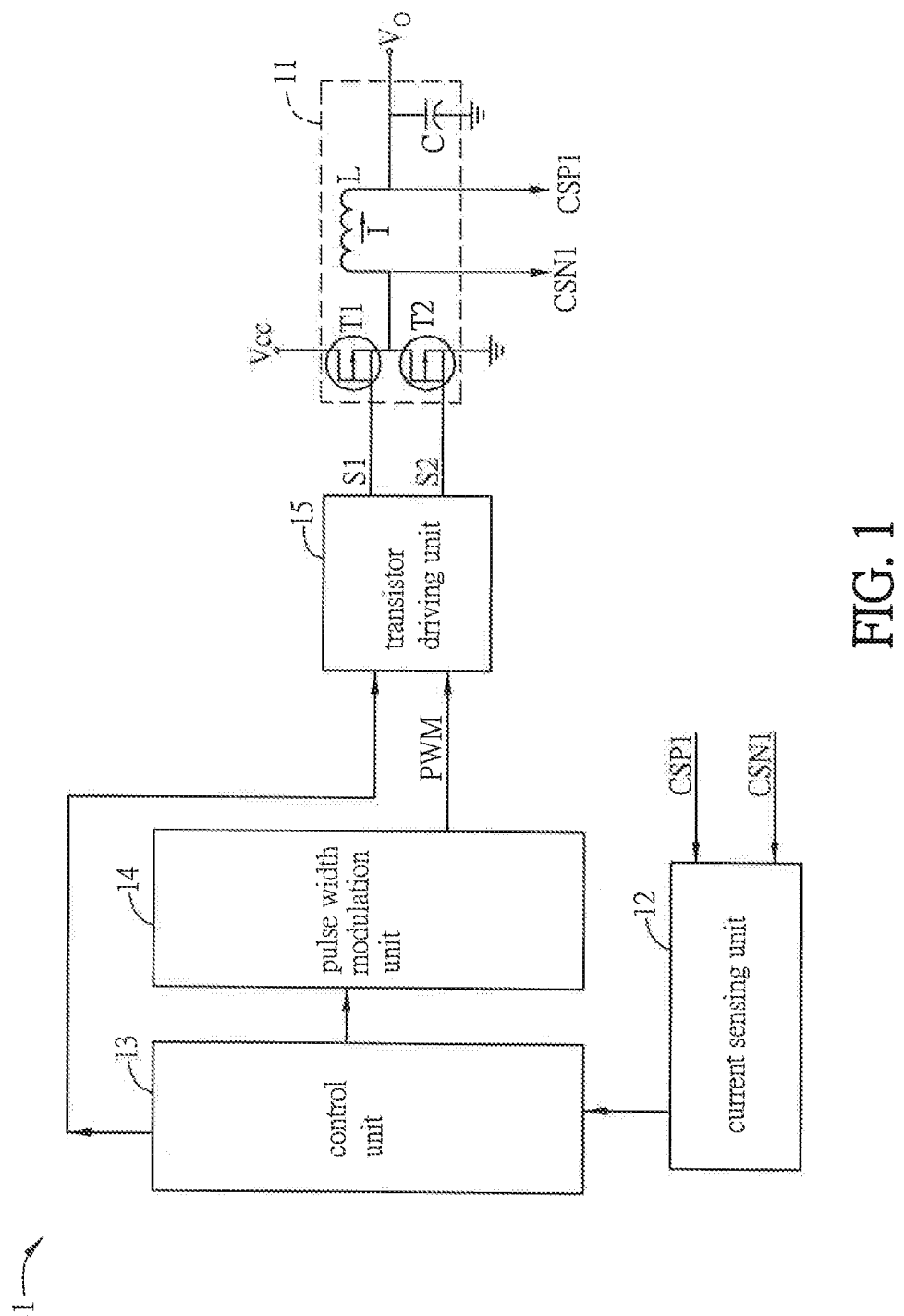
FIG. 1 is a schematic diagram showing a voltage regulator device in a preferred embodiment of the disclosure.

FIG. 1 is a schematic diagram showing a voltage regulator device in a preferred embodiment.

The voltage regulator device 1 includes an output unit 11, a current sensing unit 12, a control unit 13, a pulse width modulation unit 14 and a transistor driving unit 15.

The output unit 11 outputs an output signal. In the embodiment, the number of the output unit is one, and thus the output signal is a single phase voltage and a single phase current. The output unit 11 includes a first transistor T1, a second transistor T2, an energy storage element L and a capacitor C. The second transistor T2 is electronically connected to the first transistor T1 and the energy storage element L, respectively.

The first transistor T1 or the second transistor T2 may be a power transistor, such as a PMOS (metal-oxide semiconductor) or a NMOS power transistor. In the embodiment, the first transistor T1 and the second transistor T2 are PMOS power transistors and the energy storage element L is an inductor. In addition, the energy storage element L is used to store energy. The electric energy is temporarily stored in the energy storage element L when the current flows through the storage element L, and the electric energy is released to stabilize the current when the current is insufficient. In addition, the capacitor C can store electric energy and has a filter function to ensure a stable power supply to the CPU.

The gate of the first transistor T1 receives a first driving signal S1 from the transistor driving unit 15. The drain of the first transistor T1 is connected to a voltage Vcc, and the source of the first transistor T1 is connected to a first end of the energy storage element L and the drain of the second transistor T2. In addition, the gate of the second transistor T2 receives a second driving signal S2 from the transistor driving unit 15. The drain of the second transistor T2 is connected to the source of the first transistor T1 and the first end of the energy storage element L. The source of the second transistor T2 is connected to the ground. The capacitor C is connected to a second end of the energy storage element L and an output end $V_O$. The output end $V_O$ supplies the core voltage to the CPU.

The control unit 13 is electronically connected to the current sensing unit 12, the pulse width modulation unit 14, the transistor driving unit 15 and the output unit 11, respectively. The pulse width modulation unit 14 is electronically connected to the control unit 13 and the output unit 11. The transistor driving unit 15 is electronically connected to the control unit 13, the pulse width modulation unit 14 and the output unit 11, respectively. The transistor driving unit 15 is disposed corresponding to the output unit 11 and drives the output unit 11 correspondingly. For example, when the control unit 13 generates a corresponding control signal to control the pulse width modulation unit 14, the pulse width modulation unit 14 generates a PWM signal to control the transistor driving unit 15, which makes the transistor driving unit 15 output the first driving signal S1 and the second driving signal S2 to control the first transistor T1 and the second transistor T2 of the output unit 11, and then the output unit 11 can output the current I to the output end Vo to provide the required current to the CPU. The control unit 13 may increase the current I by increasing the pulse width of the PWM signal to provide the required current to the overloaded CPU. When the CPU is in a light load state, the control unit 13 may decrease the current I by decreasing the pulse width of the PWM signal to provide the required current to the under load CPU.

The current sensing unit 12 is electronically connected to the first end and the second end of the energy storage element L, that is, the current sensing unit 12 is across the energy storage element L to sense the current I flowing through the energy storage element L of the output unit 11 to make the control unit 13 generate a corresponding control signal to control the pulse width modulation unit 14 or the transistor driving unit 15, and then control the output unit 11. It is defined that the direction of the current I flowing from the first end to the second end (and an output terminal Vo) of the energy storage element L is positive, while the direction of the current I flowing from the second end of the storage element L to the first end of the storage element L is negative.

When the current flowing through the energy storage element L of the output unit 11 sensed by the current sensing unit 12 is negative, the control unit 13 controls the first transistor T1 and the second transistor T2 of the output unit 11 to turn off, so as to cut off the negative current of the energy storage element L. Thus, the energy storage element L of the output unit 11 would not generate a negative current flowing from the first end of the energy storage element L to the second end, and even would not flow through the drain and source of second transistor T2 to the ground.

Figure 2:
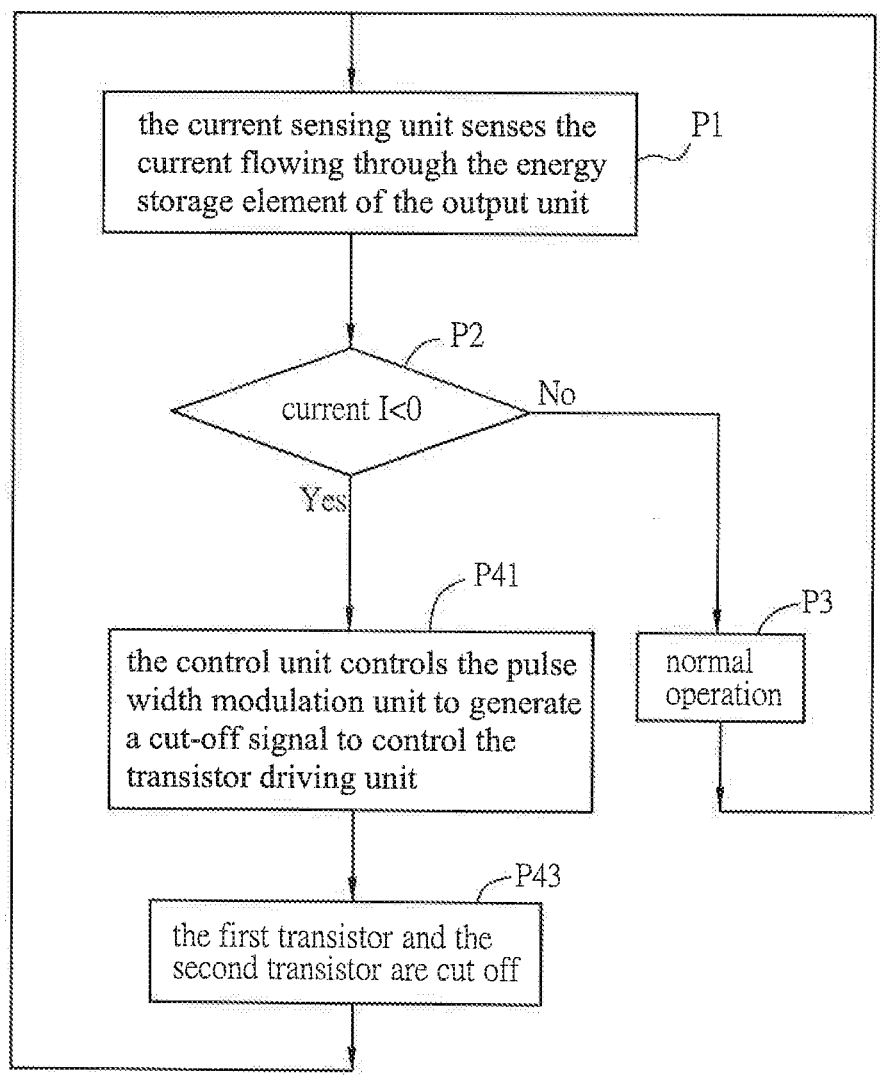
FIG. 2 and FIG. 3 are flow charts showing a control method of the voltage regulator device shown in FIG. 1.
Figure 3:
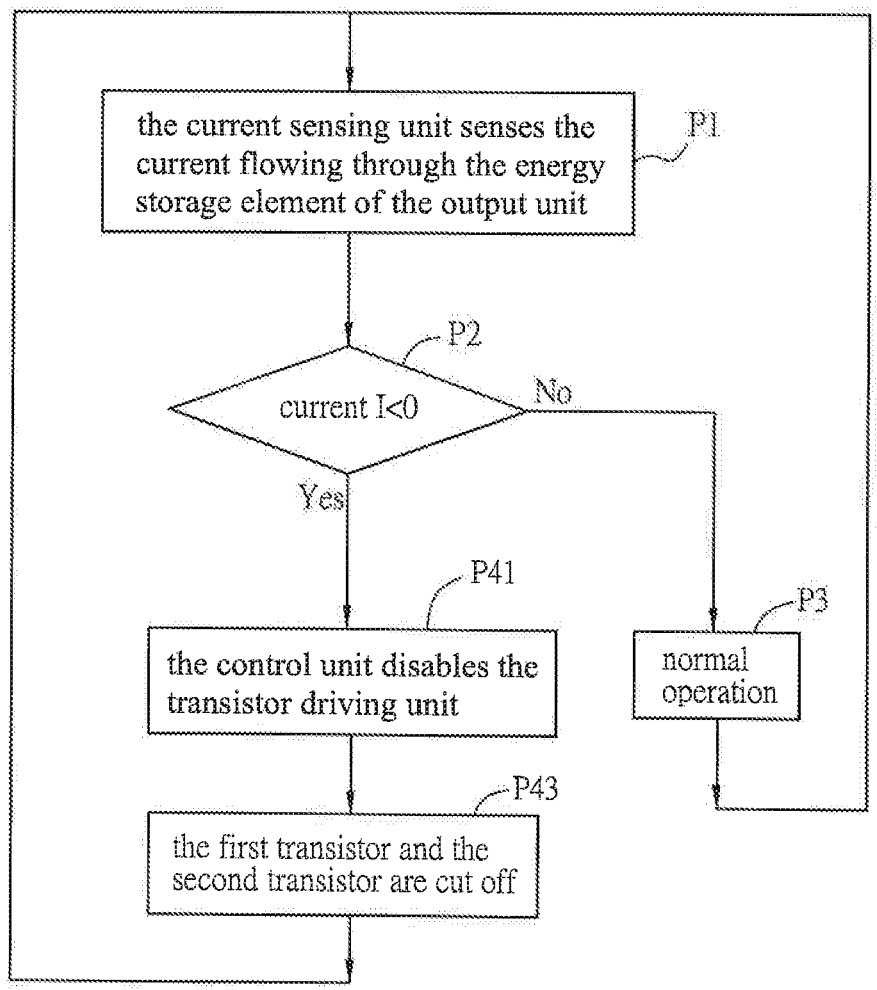

Please refer to FIG. 1, FIG. 2 and FIG. 3. FIG. 2 and FIG. 3 are flow charts showing a control method of the voltage regulator device shown in FIG. 1

In normal operating condition, as shown in step P1: the current sensing unit 12 senses the current I flowing through the energy storage element L of the output unit 11. As shown in step P2: when the current I is positive (I>0), and then a normal operation is executed in step P3. The normal operation is that the pulse width modulation unit 14 generates a PWM signal to control the transistor driving unit 15 to drive the first transistor T1 and the second transistor T2 to output the current I to the output end Vo so as to supply power to the CPU normally. When the first driving signal S1 output from the transistor driving unit 15 is at a high level and the second driving signal S2 is at a low level, the first transistor T1 turns on and the second transistor T2 turns off, the voltage Vcc can provide a positive current I to the output end Vo via the first transistor T1 and the energy storage element L.

When the current I is negative (I<0), the step P41 (as shown in FIG. 2) or step P42 (as shown in FIG. 3) is executed to control the turn-off of the first transistor T1 and the second transistor T2 (step P43).

As shown in FIG. 2, in step P41 and step P43: the control unit 13 controls the pulse width modulation unit 14 to generate a turn-off signal to control the transistor driving unit 15, and then to control the first transistor T1 and the second transistor T2 to turn off. The control unit 13 controls the pulse width modulation unit 14 to generate PWM signal to control the transistor driving unit 15. The turn-off signal output from the transistor driving unit 15 includes the first driving signal S1 and the second driving signal S2, and both the first driving signal S1 and the second driving signal S2 are at low level. The first driving signal S1 (at low level) makes the first transistor T1 be turn-off, the second driving signal S2 (at low level) also makes the second transistor T2 be turn-off. The negative current I flowing through the energy storage element L would not flow through the drain and the source of the second transistor T2 to the ground (without negative current loop), and thus a negative current would not be generated, which makes the voltage regulator device 1 operate at a diode-emulation-mode (DEM). Then, the above control steps are repeated at the next power supply period.

In another embodiment, as shown in FIG. 3, in step P42 and P43, the control unit 13 disables the transistor driving unit 15 and then controls the first transistor T1 and the second transistor T2 to turn off. In other words, the control unit 13 can generate a disable signal to disable the transistor driving unit 15, which makes the transistor driving unit 15 cannot output the first driving signal S1 and the second driving signal S2. Consequently, the first transistor T1 and the second transistor T2 are turned off. Thus, the negative current I of the energy storage element L does not flow through the drain and source of the second transistor T2 to the ground, and thus a negative current would not be generated. Then, the above control steps are repeated at the next power supply period.

Since the voltage regulator device 1 does not generate a negative current, no additional losses are generated, the overall efficiency would not be reduced, and the time delay which reduces the reaction time of the voltage regulating device 1 would not be generated.

Figure 4:
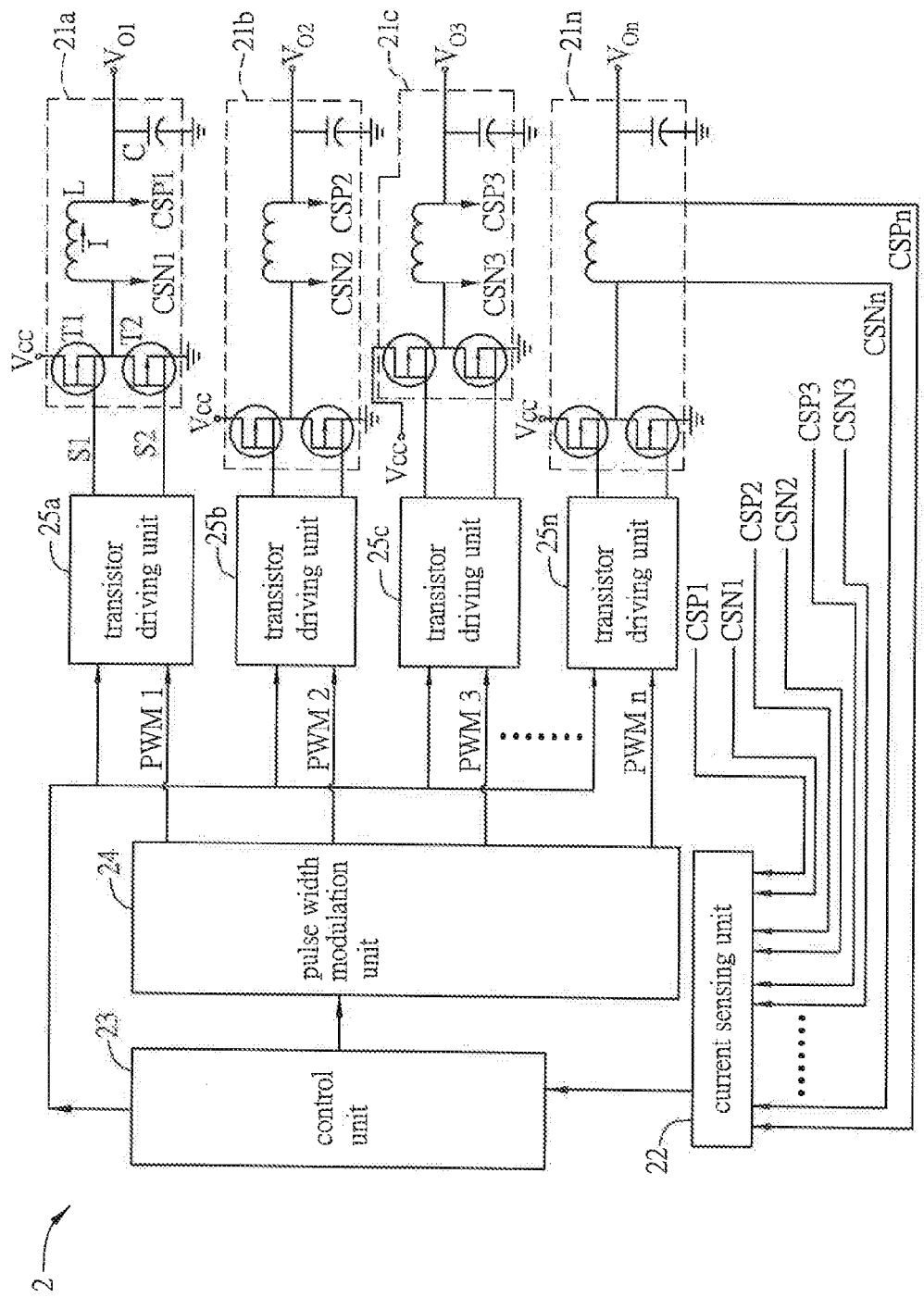
FIG. 4 is a schematic diagram showing a voltage regulator device in another preferred embodiment of the disclosure.

Please refer to FIG. 4. FIG. 4 is a schematic diagram showing a voltage regulator device in another preferred embodiment of the disclosure.

The main difference between the voltage regulator device 2 and the voltage regulator device 1 is that the voltage regulator device 2 includes a plurality of output units 21a, 21b . . . , 21n and a plurality of transistor driving units 25a, 25b, . . . , 25n, and the output units 21a, 21b . . . , 21n are set corresponding to the transistor driving units 25a, 25b, . . . , 25n, respectively, and drive the transistor driving unit 225a, 25b, . . . , 25n correspondingly. The output units 21a, 21b, . . . 21n have the same technical features with the output unit 11, and the transistor driving units 25a, 25b, . . . , 25n have the same technical features with the transistor driving unit 15, which is omitted herein.

The voltage regulator device 2 further includes a current sensing unit 22, a control unit 23 and a pulse width modulation unit 24. The current sensing unit 22, the control unit 23 and the pulse width modulation unit 24 have the same technical feature with the current sensing unit 12, the control unit 13 and the pulse width modulation unit 14 of the voltage regulator device 1, respectively, which is omitted herein.

The output units 21a, 21b, . . . , 21n also can output an output signal with a different phase, respectively, such as output signals with three-phase (the phase difference is 120 degrees), eight-phase (the phase difference is 45 degrees) or sixteen-phase (the phase difference is 22.5 degrees), which is not limited herein. Additionally, the current sensing unit 22 is electronically connected to the first end and the second end of the energy storage element L of the output unit 21a, 21b, . . . , 21n, respectively. The current sensing unit 22 can sense the current I flowing through each energy storage element L of the output unit 21a, 21b, . . . , 21n to make the control unit 23 generate a corresponding control signal to control the pulse width modulation unit 24 or control the transistor driving unit 25a, 25b, . . . , 25n, and then correspondingly control the output unit 21a, 21b, . . . , 21n. For example, when the control unit 23 generates a corresponding control signal to control the pulse width modulation unit 24, the pulse width modulation unit 24 may generate a PWM1 to control the transistor driving unit 25a to make the transistor driving unit 25a correspondingly output the first driving signal S1 and the second driving signal S2 to control the first transistor T1 and the second transistor T2 of the output unit 21a, so as to make that the output unit 21a can output the current I to the output end Vo1 to provide the required current to the CPU.

When the current sensing unit 12 senses that the current flowing through the energy storage element L of each output unit 21a, 21b . . . , 21n sensed is negative, the control unit 23 controls to turn off the first transistor T1 and the second transistor T2 of the corresponding output unit 21a, 21b, . . . , 21n to cut off the negative current of the energy storage element L. Thus, the energy storage element L would not generate a negative current, so there are no additional losses to reduce the overall efficiency, and the time delay which reduces the reaction time of the voltage regulating device 2 is not generated In addition, the other technical features of the voltage regulator device 2 and the control method thereof can refer to the voltage regulator device 1 and the control method thereof, which are not repeated herein.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A voltage regulator device, comprising:
   at least one output unit outputting an output signal, wherein the output unit includes a first transistor, a second transistor and an energy storage element, and the second transistor is electronically connected to the first transistor and the energy storage element, respectively;
   a current sensing unit electronically connected to the energy storage element to sense a current of the energy storage element,
   a control unit electronically connected to the current sensing unit and the output unit, respectively;
   at least one transistor driving unit electronically connected to the control unit and the output unit; and
   a pulse width modulation unit electronically connected to the control unit and the transistor driving unit, respectively,
   wherein when the current sensing unit senses that the current flowing through the energy storage element of the output unit is negative, the control unit correspondingly controls to cut off a negative current flowing through the energy storage element.

2. The voltage regulator device according to claim 1, wherein when the current sensing unit senses that the current of the energy storage element is negative, the control unit controls the transistor driving unit by controlling the pulse width modulation unit to generate a turn-off signal to turn-off the first transistor and the second transistor.

3. The voltage regulator device according to claim 1, wherein when the current sensing unit senses that the current of the energy storage element is negative, the control unit controls to turn off the first transistor and the second transistor by disabling the transistor driving unit.

4. The voltage regulator device according to claim 1, wherein when the number of the output units is more than one, the output units output output signals with different phases, respectively, the current sensing unit is electronically connected to the energy storage elements of the output units, and senses the current of each of the energy storage element of the output units, respectively.

5. A control method of a voltage regulator device, wherein the voltage regulator device includes at least one output unit, a current sensing unit, a control unit, a pulse width modulation unit and at least one transistor driving unit, the output unit outputs an output signal, the output unit includes a first transistor, a second transistor and an energy storage element, the second transistor is electronically connected to the first transistor and the energy storage element, respectively, the current sensing unit is electronically connected to the energy storage element, the control unit is electronically connected to the current sensing unit, the output unit, the pulse width modulation unit, and the transistor driving unit, the control method comprising:
   the current sensing unit sensing a current flowing through the energy storage element of the output unit; and
   wherein when the current sensing unit senses that the current flowing through the energy storage element of the output unit is negative, the control unit correspondingly controls to turn off the first transistor and the second transistor of the output unit to cut off a negative current of the energy storage element.

6. The control method according to claim 5, wherein in the step of controlling to turn off the first transistor and the second transistor of the output unit, the control unit controls the corresponding transistor driving unit by controlling the pulse width modulation unit to generate a turn-off signal, and then controls to turn off the first transistor and the second transistor.

7. The control method according to claim 5, wherein in the step of controlling to turn off the first transistor and the second transistor of the output unit, the control unit controls to turn off of the first transistor and the second transistor by disabling the transistor driving unit.

8. The control method according to claim 5, wherein when the number of the output units is more than one, the output units output output signals with different phases, respectively, and the current sensing unit senses the current flowing through each energy storage element of the output units, respectively.

9. The voltage regulator device according to claim 1, wherein when the current is positive, the first transistor and the second transistor are controlled in a normal operation.

10. The voltage regulator device according to claim 1, wherein the first transistor and the second transistor are turned off so the negative current of the energy storage element does not flow through the drain and source of the second transistor to a ground.

11. The control method according to claim 5, wherein when the current is positive, the first transistor and the second transistor are controlled in a normal operation.

12. The control method according to claim 5, wherein the first transistor and the second transistor are turned off so the negative current of the energy storage element does not flow through the drain and source of the second transistor to a ground.

* * * * *